United States Patent
Otsuka et al.

(10) Patent No.: US 10,664,334 B2
(45) Date of Patent: May 26, 2020

(54) ROBOT THAT DIAGNOSES FAILURE, FAILURE DIAGNOSIS SYSTEM, FAILURE DIAGNOSIS METHOD, AND RECORDING MEDIUM

(71) Applicant: CASIO COMPUTER CO., LTD., Shibuya-ku, Tokyo (JP)

(72) Inventors: Toshihiko Otsuka, Ome (JP); Hiroki Atsumi, Tachikawa (JP); Takahiro Tomida, Hamura (JP); Yoshihiro Kawamura, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 184 days.

(21) Appl. No.: 15/645,142

(22) Filed: Jul. 10, 2017

(65) Prior Publication Data

US 2018/0089013 A1 Mar. 29, 2018

(30) Foreign Application Priority Data

Sep. 23, 2016 (JP) .................. 2016-185926

(51) Int. Cl.
*G06F 11/00* (2006.01)
*G06F 11/07* (2006.01)
*G06F 11/32* (2006.01)
*G11B 7/09* (2006.01)

(52) U.S. Cl.
CPC .......... *G06F 11/0748* (2013.01); *G06F 11/07* (2013.01); *G06F 11/324* (2013.01); *G06F 11/327* (2013.01); *G06F 11/0703* (2013.01); *G11B 7/0941* (2013.01)

(58) Field of Classification Search
CPC .... G06F 11/0748; G06F 11/07; G06F 11/324; G06F 11/327; G06F 11/0703; G06F 11/079; G11B 7/0941
See application file for complete search history.

(56) References Cited

U.S. PATENT DOCUMENTS

| 6,556,892 B2 | 4/2003 | Kuroki et al. |
| 7,383,717 B2 | 6/2008 | Kawaguchi et al. |
| 2002/0120361 A1 | 8/2002 | Kuroki et al. |

(Continued)

FOREIGN PATENT DOCUMENTS

| CN | 1372505 A | 10/2002 |
| JP | 2001277163 A | 10/2001 |

(Continued)

OTHER PUBLICATIONS

Japanese Office Action (and English language translation thereof) dated Aug. 7, 2018 issued in Japanese Application No. 2016-185926.

(Continued)

*Primary Examiner* — Joseph D Manoskey
(74) *Attorney, Agent, or Firm* — Holtz, Holtz & Volek PC

(57) ABSTRACT

A robot, failure diagnosis system, failure diagnosis method, and recording medium that enable easy diagnosis of a failure of a robot are provided. In a robot 100, a failure diagnosis unit 150 diagnoses a failure of the robot 100, based on a spontaneous self motion made by the robot 100 independently of a predetermined target without interaction with the predetermined target.

16 Claims, 8 Drawing Sheets

(56) References Cited

U.S. PATENT DOCUMENTS

| | | | |
|---|---|---|---|
| 2002/0138822 A1* | 9/2002 | Noma | B25J 9/1674 717/131 |
| 2005/0197739 A1* | 9/2005 | Noda | B25J 11/001 700/245 |
| 2005/0216121 A1* | 9/2005 | Sawada | G06N 3/008 700/245 |
| 2006/0059975 A1 | 3/2006 | Kawaguchi et al. | |
| 2006/0214621 A1* | 9/2006 | Ogawa | B25J 9/1674 318/568.12 |
| 2009/0143913 A1* | 6/2009 | Kim | B25J 9/1674 700/259 |
| 2012/0283873 A1* | 11/2012 | Le | B25J 9/1674 700/250 |
| 2013/0211782 A1* | 8/2013 | Rosenberg | B25J 9/16 702/182 |
| 2018/0268217 A1* | 9/2018 | Murase | G06K 9/00664 |

FOREIGN PATENT DOCUMENTS

| | | | |
|---|---|---|---|
| JP | 2002144260 A | 5/2002 | |
| JP | 2006082201 A | 3/2006 | |
| JP | 2007152470 A | 6/2007 | |
| JP | 2008178959 A | 8/2008 | |

OTHER PUBLICATIONS

Chinese Office Action dated Sep. 25, 2019 (and English translation thereof) issued in Chinese Application No. 201710658452.2.

* cited by examiner

FIG. 6

SELF MOTION IN THE CASE WHERE PERSON IS PRESENT IN SURROUNDINGS BUT THERE IS NO INTERACTION

| EMOTION | SELF MOTION | DIAGNOSIS SITE |
|---|---|---|
| LONELY (calm<0, excite<0) | MOVE TO CORNER OF ROOM LOOKING FOR SOMETHING AND STARE | MOVABLE UNIT |
| | PATROL IN ROOM SEVERAL TIMES | MOVABLE UNIT |
| | WALK SLOWLY | MOVABLE UNIT |
| | LOOK BORED AND DAZED WITH SAD EXPRESSION | MOVABLE UNIT /DISPLAY UNIT |
| MOTIVATED (calm<0, excite≥0) | MOVE TO EDGE OF ROOM AND WANDER AROUND, LOOKING TO WANT TO GO OUTSIDE | MOVABLE UNIT |
| | PERFORM ONE-MAN PLAY | MOVABLE UNIT/DISPLAY UNIT /SOUND OUTPUT UNIT |
| | PERFORM PHANTASY PLAY | MOVABLE UNIT |
| | PLAY DETECTIVE | MOVABLE UNIT/DISPLAY UNIT /SOUND OUTPUT UNIT |
| | PRACTICE DANCE | MOVABLE UNIT/DISPLAY UNIT /SOUND OUTPUT UNIT |
| HAPPY (calm≥0, excite≥0) | SING | SOUND OUTPUT UNIT |
| | KEEP RHYTHM | MOVABLE UNIT /DISPLAY UNIT |
| | SING AND DANCE | MOVABLE UNIT/DISPLAY UNIT /SOUND OUTPUT UNIT |
| | RUN AROUND | MOVABLE UNIT |
| | PLAY MONSTER | MOVABLE UNIT/DISPLAY UNIT /SOUND OUTPUT UNIT |
| | WALK BACKWARD | MOVABLE UNIT |
| | PRACTICE EXERCISE | MOVABLE UNIT /DISPLAY UNIT |
| COMPOSED (calm≥0, excite<0) | GAZE OUTSIDE WINDOW | MOVABLE UNIT |
| | STRETCH | NONE |
| | SLEEP/YAWN | NONE |
| | SWAY BODY | NONE |
| | STARE AT NOTHING AND SUDDENLY MAKE LOUD SOUND | MOVABLE UNIT/DISPLAY UNIT /SOUND OUTPUT UNIT |

FIG. 7

SELF MOTION RESULTING FROM SURROUNDING ENVIRONMENT OR TIME

| CONDITION | SELF MOTION | DIAGNOSIS SITE |
|---|---|---|
| HEAR MUSIC | CHANGE LOOK AND WANDER AROUND | MOVABLE UNIT /DISPLAY UNIT |
| HEAR CONVERSATION OF PEOPLE | TWITCH EARS | MOVABLE UNIT |
| STROKED WITHOUT RECOGNIZING PERSON | LOOK AROUND IN SURPRISE | MOVABLE UNIT /DISPLAY UNIT |
| FIND NEW OBJECT DURING MOVEMENT (SELECT ONE DEPENDING ON EMOTION VALUE OR RANDOM NUMBER) | STARE AT OBJECT | MOVABLE UNIT /DISPLAY UNIT |
| | MOVE AND PLAY WITH OBJECT | MOVABLE UNIT /DISPLAY UNIT |
| | TOUCH OBJECT WITH TAIL TO MAKE SOUND | MOVABLE UNIT/DISPLAY UNIT /SOUND OUTPUT UNIT |
| TV IS ON | STARE AT TV AND REACT WITH TAIL, EARS, AND EXPRESSION | MOVABLE UNIT/DISPLAY UNIT /SOUND OUTPUT UNIT |
| FIND OBJECT PRODUCING SOUND | STARE AT OBJECT AND REACT WITH TAIL, EARS, AND EXPRESSION TO SOUND | MOVABLE UNIT/DISPLAY UNIT /SOUND OUTPUT UNIT |
| HEAR WORD "DOG" | BARK LIKE DOG | MOVABLE UNIT/DISPLAY UNIT /SOUND OUTPUT UNIT |
| HIGH TEMPERATURE | MUTTER "HOT" AND LOOK HAGGARD | MOVABLE UNIT /DISPLAY UNIT |
| LOW TEMPERATURE | MUTTER "COLD" AND TREMBLE | MOVABLE UNIT /DISPLAY UNIT |
| TIME TO SLEEP | MOVE TO CHARGING STATION AND SLEEP | NONE |
| WOKEN UP EARLIER THAN USUAL WAKE-UP TIME | GROAN AND NOT COME OUT OF CHARGING STATION | NONE |
| NOT WOKEN UP EVEN AFTER USUAL WAKE-UP TIME | WAKE UP ON ITS OWN AND COME OUT OF CHARGING STATION | NONE |
| MORNING OF NEW YEAR, BIRTHDAY, ETC. | MAKE RELATED REMARK | NONE |

US 10,664,334 B2

ROBOT THAT DIAGNOSES FAILURE, FAILURE DIAGNOSIS SYSTEM, FAILURE DIAGNOSIS METHOD, AND RECORDING MEDIUM

CROSS-REFERENCE TO RELATED APPLICATIONS

This application is based upon and claims the benefit of priority from the prior Japanese Patent Application No. 2016-185926, filed Sep. 23, 2016, the entire contents of which are incorporated herein by reference.

BACKGROUND OF THE INVENTION

1. Field of the Invention

The present invention relates to a robot that diagnoses a failure, a failure diagnosis system, a failure diagnosis method, and a recording medium.

2. Description of the Related Art

Techniques of diagnosing failures of robots are known.
For example, Japanese Patent Application Laid-Open No. 2008-178959 discloses a mobile robot system for diagnosing a failure of a mobile robot that includes a battery and travels autonomously. In the mobile robot system disclosed in Japanese Patent Application Laid-Open No. 2008-178959, when the mobile robot returns to a charging station, a tilt mechanism and a turn mechanism provided in the charging station are driven to diagnose a failure of each of an acceleration sensor and a directional sensor included in the mobile robot.

SUMMARY OF THE INVENTION

An aspect of a robot according to the present invention is a robot including: a motion control unit configured to cause the robot to make a motion; and a failure diagnosis unit configured to, in a case where the motion control unit causes the robot to make a spontaneous self motion without interaction with a predetermined target, diagnose a failure of the robot using the self motion.

An aspect of a failure diagnosis system according to the present invention is a failure diagnosis system including: the aforementioned robot; and a charging station that charges the robot.

An aspect of a failure diagnosis method according to the present invention is a failure diagnosis method including: causing a robot to make a motion; and diagnosing, in a case of causing the robot to make a spontaneous self motion without interaction with a predetermined target, a failure of the robot using the self motion.

An aspect of a recording medium according to the present invention is a recording medium having stored therein a program for causing a computer of a robot to function as: a motion control unit configured to cause the robot to make a motion; and a failure diagnosis unit configured to, in a case where the motion control unit causes the robot to make a spontaneous self motion without interaction with a predetermined target, diagnose a failure of the robot using the self motion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a first diagram illustrating examples of self motions of the robot.

FIG. 7 is a second diagram illustrating examples of the self motions of the robot.

DETAILED DESCRIPTION OF THE INVENTION

Figure 1:
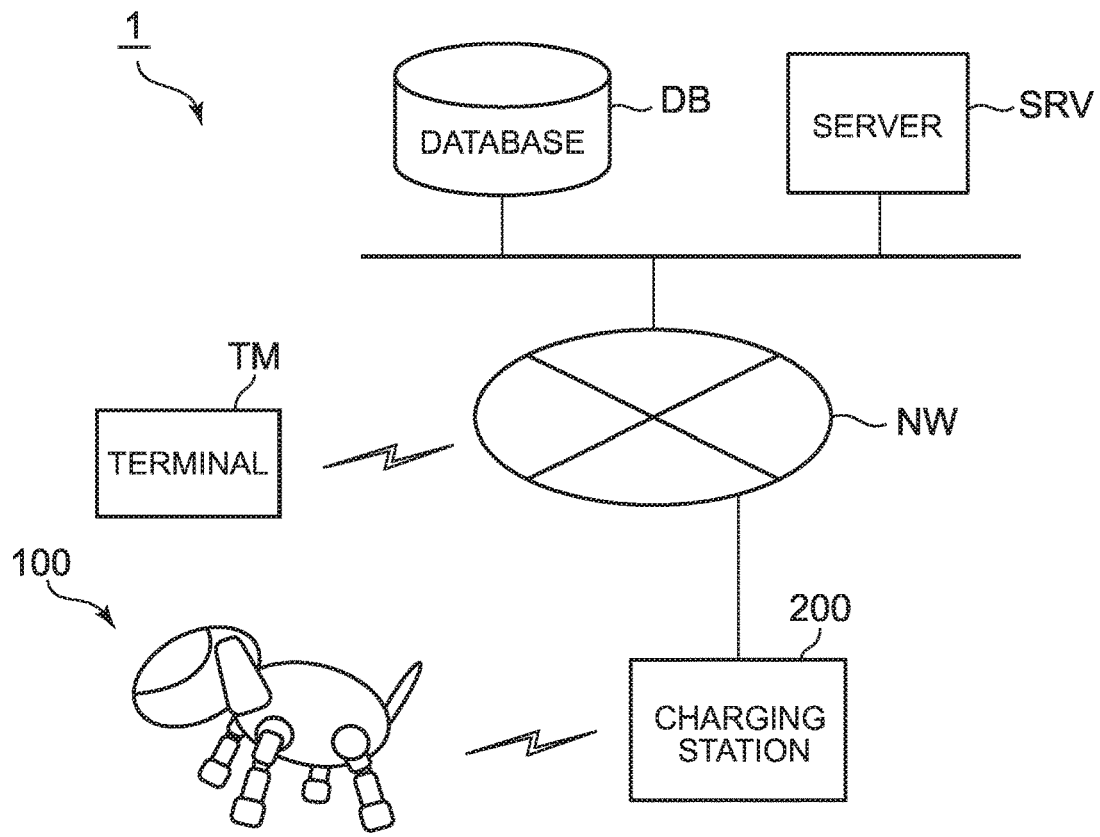
FIG. 1 is a diagram schematically illustrating a failure diagnosis system according to an embodiment of the present invention.

An embodiment of the present invention is described below, with reference to drawings. In the drawings, the same or corresponding parts are given the same reference signs.

FIG. 1 schematically illustrates a failure diagnosis system 1 and a robot 100 according to an embodiment of the present invention. As illustrated in FIG. 1, the failure diagnosis system 1 includes the robot 100, a charging station 200, a terminal TM, a server SRV, and a database DB. These components are connected to each other via a network NW. The network NW is, for example, a wide area network such as the Internet.

The robot 100 is a robotic pet made in the image of a pet kept by a user. The robot 100 is a device that is shaped to resemble an animal and makes autonomous motions according to an operation program specified beforehand. The robot 100 makes various motions, in response to external stimulation such as a call or a touch by a predetermined target, e.g. the user, present outside the device. The robot 100 can thus communicate with the predetermined target and interact with the predetermined target.

The predetermined target is a target that is present outside the robot 100 and communicates and interacts with the robot 100. Examples of the predetermined target include the user who owns the robot 100, a person (such as the user's family or friend) around the user, and an animal (such as a pet kept by the user and the like) around the user. The predetermined target may also be referred to as a communication target, a communication partner, an interaction target, an interaction partner, or the like.

Figure 2:
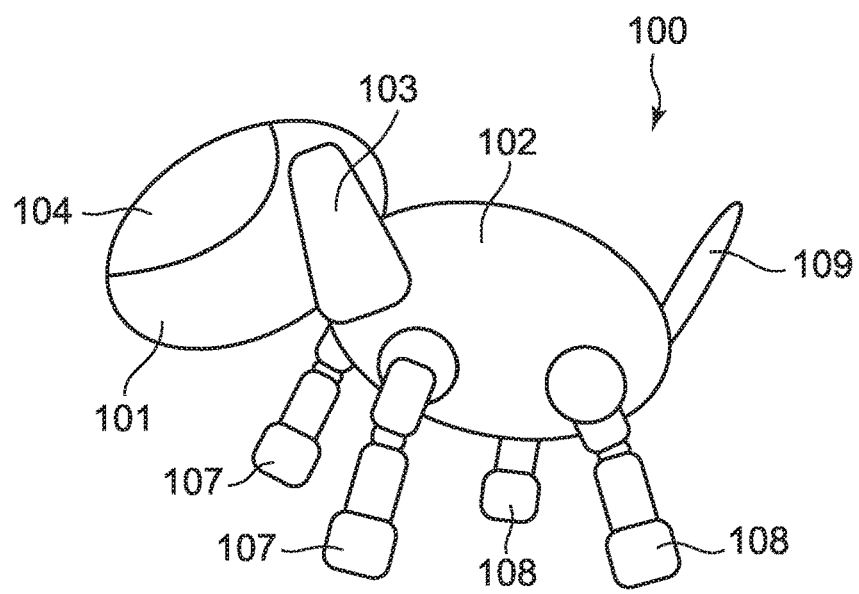
FIG. 2 is a diagram illustrating an appearance of a robot according to the embodiment of the present invention.

As illustrated in FIG. 2, the robot 100 has a three-dimensional shape mimicking a small dog in appearance. For example, the robot 100 is mainly made of hard synthetic resin such as plastic. The robot 100 includes a head part 101, a trunk part 102, an ear part 103, a face part 104, an arm part 107, a leg part 108, and a tail part 109.

The head part 101, the ear part 103, the arm part 107, the leg part 108, and the tail part 109 are parts that can be moved by a drive member such as a motor or an actuator included in the robot 100. For example, the robot 100 can travel by moving the arm part 107 and the leg part 108. The robot 100 can mimic a dog's motion or gesture by moving the head part 101 or the ear part 103, wagging the tail part 109, and the like.

The face part 104 includes a display device, a camera, a speaker, and various sensors. The display device displays various images including eyes, nose, and mouth. The camera captures an image of the surroundings, thus functioning as the eyes of the robot 100. The speaker outputs sound such as whine or bark. The face part 104 thus functions as the face of the robot 100.

Figure 3:
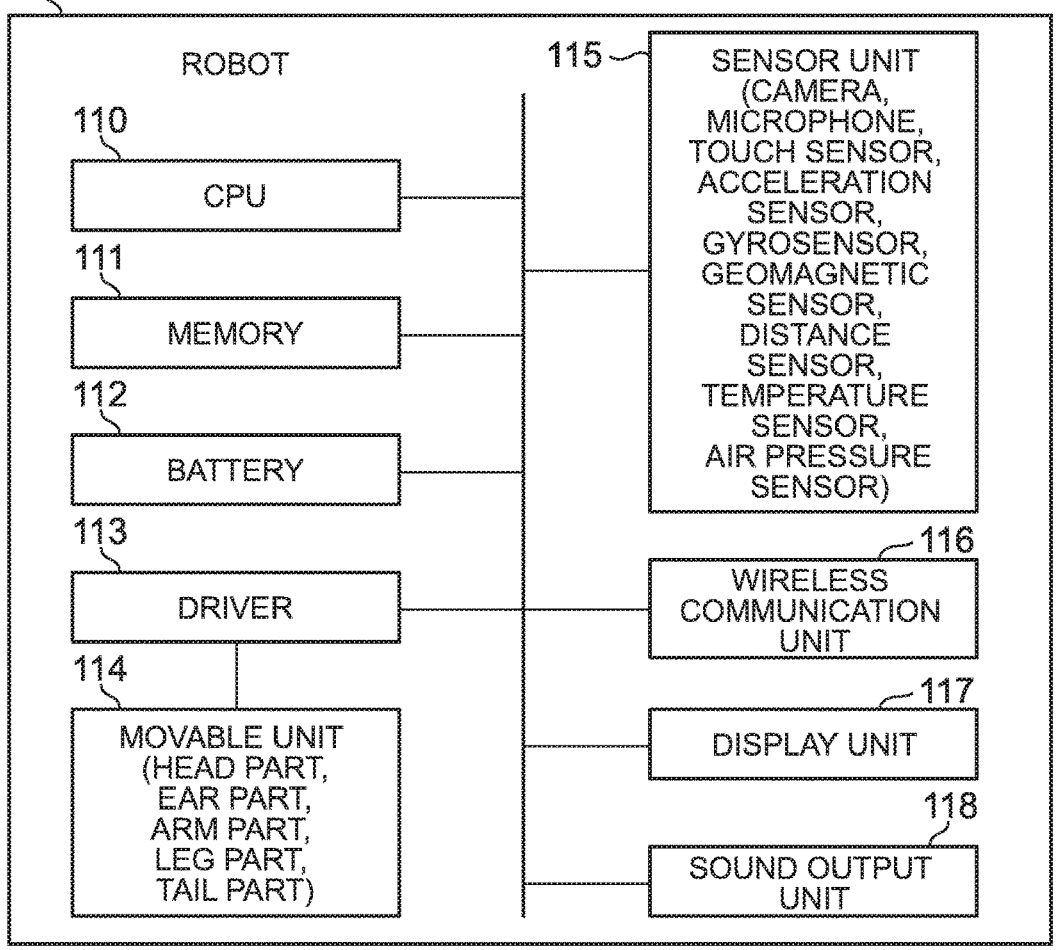
FIG. 3 is a block diagram illustrating a hardware structure of the robot.

As illustrated in FIG. 3, the robot 100 includes a central processing unit (CPU) 110, memory 111, a battery 112, a driver 113, a movable unit 114, a sensor unit 115, a wireless communication unit 116, a display unit 117, and a sound output unit 118.

The CPU 110 is a microprocessor as an example, and is the central processing unit executing various processes and operations. The CPU 110 is connected to each part of the robot 100 via a system bus which is a transfer path for transferring instructions and data, and controls the entire robot 100.

The memory 111 includes random access memory (RAM) functioning as working memory of the CPU 110, and non-volatile memory such as read only memory (ROM) or flash memory. The memory 111 stores various programs and data used to perform various processes by the CPU 110, including an operating system (OS) and application programs. The memory 111 also stores various data generated or acquired as a result of the CPU 110 performing various processes.

The battery 112 is a storage battery that stores electrical energy and supplies power to each part of the robot 100. The battery 112 is charged by the charging station 200 when the robot 100 returns to the charging station 200.

The driver 113 includes a drive member including a motor and an actuator for driving the movable unit 114 of the robot 100, and a drive circuit for driving the drive member. The movable unit 114 includes movable parts such as the head part 101, the ear part 103, the arm part 107, the leg part 108, and the tail part 109. The CPU 110 transmits a control signal to the drive circuit based on the operation program. The drive circuit supplies a drive pulse signal to the drive member, according to the control signal received from the CPU 110. The drive member drives the movable unit 114, according to the pulse signal supplied from the drive circuit.

The robot 100 can make various motions, by the driver 113 driving the movable unit 114. For example, by moving the arm part 107 and the leg part 108, the robot 100 can move forward or backward, turn, sit down, stand up, or lie down. The robot 100 can also turn the head part 101, move the ear part 103, and wag the tail part 109 from side to side and up and down.

The sensor unit 115 includes a plurality of sensors for detecting physical quantities in the surroundings or inside of the device. In detail, the sensor unit 115 includes a camera for capturing an image of the surroundings, a microphone for detecting sound, a touch sensor for detecting a touch on the device, an acceleration sensor for detecting the movement of the device, a gyrosensor for detecting the rotation of the device, a geomagnetic sensor for detecting orientation, a distance sensor for detecting the distance to an object in the surroundings, a temperature sensor for detecting ambient temperature, and an air pressure sensor for detecting ambient pressure. For example, the camera, the microphone, and the distance sensor are installed inside the face part 104, the touch sensor is installed in each portion of the surface of the robot 100, and the acceleration sensor, the gyrosensor, the geomagnetic sensor, and the temperature sensor are installed inside the trunk part 102. The sensor unit 115 acquires information indicating the surrounding or internal state of the robot 100 through these sensors, and supplies the information to the CPU 110.

The wireless communication unit 116 includes an interface for wirelessly communicating with external equipment. Under control of the CPU 110, the wireless communication unit 116 wirelessly communicates with the charging station 200 according to, for example, a wireless local area network (LAN) such as Wi-Fi (Wireless Fidelity) or a communication standard such as Bluetooth®.

The display unit 117 includes a display device such as a liquid crystal display, an organic electro luminescence (EL) display, or a light emitting diode (LED), and a display drive circuit for causing the display device to display an image. The display device is fitted into the face part 104. The display drive circuit converts image data transmitted from the CPU 110 into a display signal at predetermined synchronization timing and transfers the display signal to the display unit 117, to cause the display unit 117 to display an image.

In detail, the display unit 117 displays an image of eyes, nose, mouth, etc., and represents various expressions by changing them. The display unit 117 displays various images other than eyes, nose, mouth, etc., depending on situation.

The sound output unit 118 includes a speaker and a sound output interface, and converts sound data generated by the CPU 110 into sound and outputs the sound. The speaker is fitted into the face part 104. The sound output unit 118 outputs various sounds including animal call and human speech. For example, the robot 100 collects the sound of the predetermined target by the microphone in the sensor unit 115, and outputs the sound corresponding to the sound of the predetermined target from the sound output unit 118. This enables simple conversation with the predetermined target.

The description returns to the failure diagnosis system 1 illustrated in FIG. 1. The charging station 200 is equipment for monitoring and managing the robot 100. The charging station 200 is installed in an appropriate location so that the robot 100 can autonomously move (return) to the charging station 200, such as in the same building or same room as the robot 100. The charging station 200 charges the battery 112 of the returned robot 100. The charging station 200 also supports various operations of the robot 100 including failure diagnosis.

Figure 4:
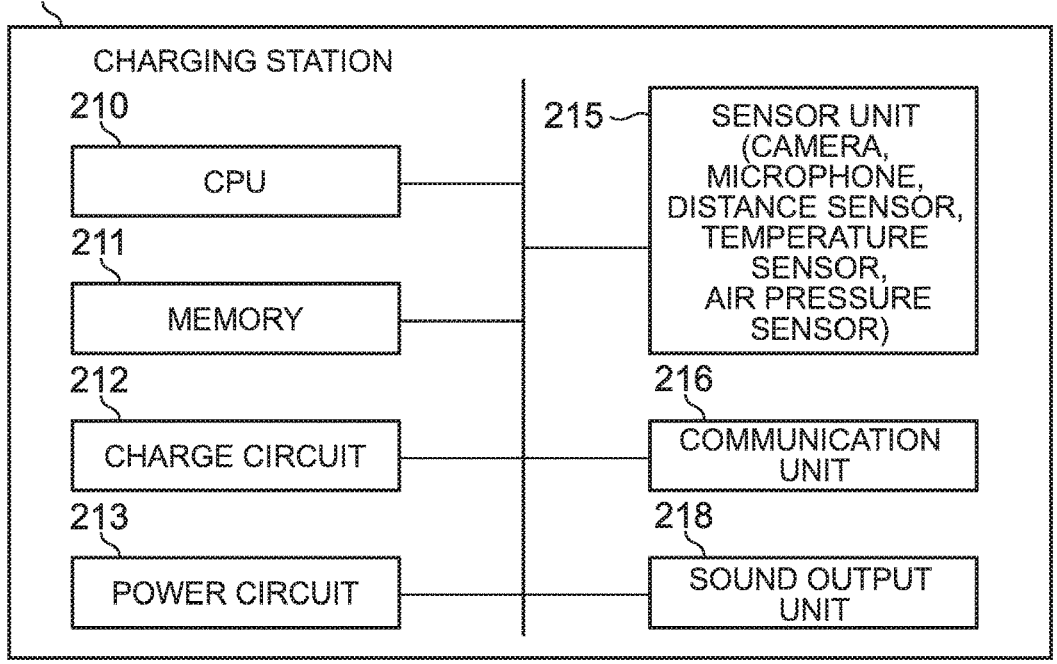
FIG. 4 is a block diagram illustrating a hardware structure of a charging station.

As illustrated in FIG. 4, the charging station 200 includes a CPU 210, memory 211, a charge circuit 212, a power circuit 213, a sensor unit 215, a communication unit 216, and a sound output unit 218.

The CPU 210 is a microprocessor as an example, and is a central processing unit executing various processes and operations. The CPU 210 is connected to each part of the charging station 200 via a system bus which is a transfer path for transferring instructions and data, and controls the entire charging station 200.

The memory 211 includes RAM functioning as working memory of the CPU 210, and non-volatile memory such as ROM or flash memory. The memory 211 stores various programs and data used to perform various processes by the CPU 210, including an OS and application programs. The memory 211 also stores various data generated or acquired as a result of the CPU 210 performing various processes.

The charge circuit 212 includes a charge integrated circuit (IC), and charges the battery 112 of the robot 100. The power circuit 213 includes a power IC, and generates power necessary for each part of the charging station 200 and supplies the power. The charge circuit 212 supplies the robot 100 with the power generated by the power circuit 213, when the robot 100 returns to the charging station 200.

The sensor unit 215 includes a plurality of sensors for detecting physical quantities in the surroundings or inside of the device. In detail, the sensor unit 215 includes a camera for capturing an image of the surroundings, a microphone for detecting sound, a distance sensor for detecting the distance to an object in the surroundings, a temperature sensor for detecting ambient temperature, and an air pressure sensor for detecting ambient pressure. The sensor unit 215 acquires information indicating the surrounding or internal state of the charging station 200 through these sensors, and supplies the information to the CPU 210.

The communication unit 216 includes an interface for wiredly or wirelessly communicating with external equipment. Under control of the CPU 210, the communication unit 216 wirelessly communicates with the robot 100 according to, for example, a wireless LAN such as Wi-Fi or a communication standard such as Bluetooth®. The communication unit 216 also communicates wiredly or wirelessly with the server SRV, the database DB, and the terminal TM via the network NW.

The sound output unit 218 includes a speaker and a sound output interface, and converts sound data generated by the CPU 210 into sound and outputs the sound. The sound output unit 218 outputs the sound to the robot 100, thus transmitting various instructions, such as failure diagnosis and return, to the robot 100.

The description returns to the failure diagnosis system 1 illustrated in FIG. 1. The terminal TM is a communication terminal operated by the user, such as a mobile phone, a smart phone, or a tablet terminal. The terminal TM includes a CPU, ROM, RAM, and a communication interface, and communicates with the charging station 200, the server SRV, and the database DB via the network NW.

In detail, the terminal TM receives a failure diagnosis result of the robot 100, from the server SRV. The terminal TM includes a user interface including a display unit, a sound output unit, and an input unit. The terminal TM notifies the failure diagnosis result of the robot 100 received from the charging station 200 or the server SRV, to the user (the owner of the robot 100) via the display unit, the sound output unit, etc.

The server SRV and the database DB are installed in a management company that manages the robot 100, such as distributor or manufacturer of the robot 100. The server SRV includes a CPU, ROM, RAM, and a communication interface, and communicates with the charging station 200 and the terminal TM via the network NW.

In detail, the server SRV transmits a diagnosis program for diagnosing a failure of the robot 100, to the charging station 200. The server SRV receives the failure diagnosis result of the robot 100 obtained according to the diagnosis program from the charging station 200, and stores diagnosis data indicating the received failure diagnosis result in the database DB. The server SRV notifies the terminal TM of the failure diagnosis result of the robot 100 stored in the database DB, at predetermined timing.

Figure 5:
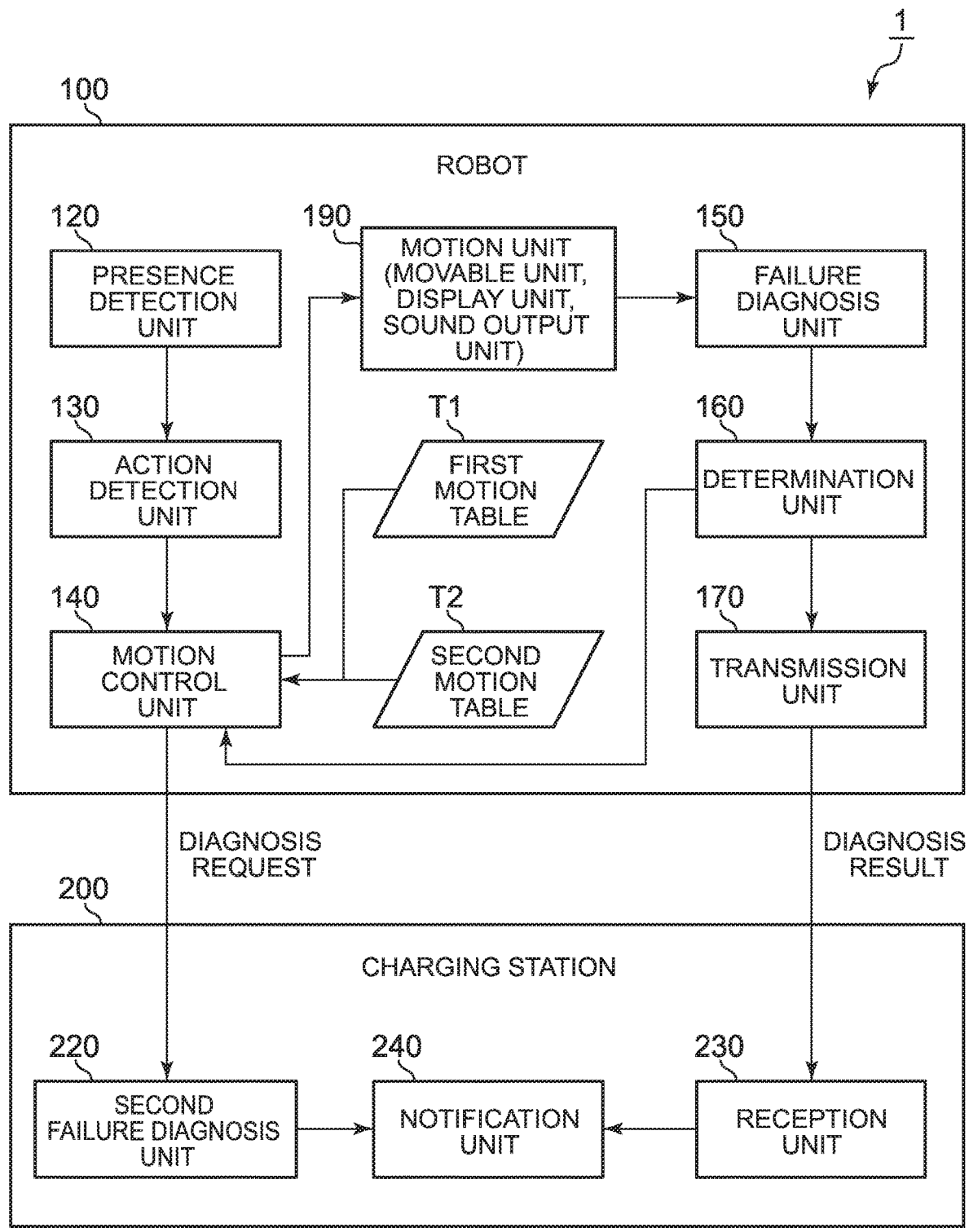
FIG. 5 is a block diagram illustrating a functional structure of the failure diagnosis system.

FIG. 5 illustrates the functional structure of the failure diagnosis system 1. As illustrated in FIG. 5, the robot 100 functionally includes a presence detection unit 120, an action detection unit 130, a motion control unit 140, a failure diagnosis unit 150, a determination unit 160, and a transmission unit 170. The CPU 110 reads the program stored in the ROM into the RAM and executes the program to perform control, thus functioning as each of these units. The robot 100 includes a motion unit 190 including the movable unit 114, the display unit 117, and the sound output unit 118, and has a first motion table T1 and a second motion table T2 stored in the memory 111.

The presence detection unit 120 detects the presence of the predetermined target outside the robot 100. The predetermined target is a target that serves as an interaction partner (communication partner) for the robot 100, such as the user who owns the robot 100, a person around the user, or an animal around the user.

The presence detection unit 120 captures an image of the surroundings of the device by the camera in the sensor unit 115, to acquire the image showing the state of the surroundings. The camera is provided in the face part 104 of the robot 100, and serves as the eyes. The presence detection unit 120 performs appropriate image processing such as background differencing or face recognition on the image captured by the camera, to determine whether or not a person or an animal is shown in the acquired image. The presence detection unit 120 is thus realized by the CPU 110 cooperating with the camera in the sensor unit 115.

The action detection unit 130 detects an action of the predetermined target present outside the robot 100, to the robot 100. The action of the predetermined target to the robot 100 means an action, such as a dialog or a touch, performed by the predetermined target in order to interact (communicate) with the robot 100. As the action to the robot 100, for example, the predetermined target calls the robot 100, touches the surface of the robot 100, or gestures to the robot 100. The action detection unit 130 detects such an action of the predetermined target by various sensors in the sensor unit 115.

In detail, in the case where the predetermined target calls the robot 100, the action detection unit 130 detects the sound coming from the predetermined target via the microphone in the sensor unit 115. In the case where the predetermined target touches the surface of the robot 100, the action detection unit 130 detects the touch via the touch sensor in the sensor unit 115. In the case where the predetermined target gestures the robot 100, the action detection unit 130 detects the gesture via the camera in the sensor unit 115. The action detection unit 130 is thus realized by the CPU 110 cooperating with the microphone, the touch sensor, the camera, or the like in the sensor unit 115.

The motion control unit 140, in the case where the action detection unit 130 detects the action of the predetermined target to the robot 100, causes the robot 100 to make a first motion for responding to the detected action. The first motion is a response motion responding to the action of the predetermined target, and is a motion for interacting (communicating) with the predetermined target. The first motion is also referred to as an interaction motion (interaction action), a response motion (response action), or the like.

The motion control unit 140 causes the robot 100 to make the first motion, by operating at least one of the movable unit 114, the display unit 117, and the sound output unit 118 in the motion unit 190. In detail, in the case where the action detection unit 130 detects a sound from the predetermined target, the motion control unit 140 outputs a sound corresponding to the detected sound from the sound output unit 118, moves the head part 101 to turn to the predetermined target, or moves the arm part 107 and the leg part 108 to move to the predetermined target. In the case where the action detection unit 130 detects a touch, the motion control unit 140 wags the tail part 109, or displays a predetermined image on the display unit 117. In the case where the action detection unit 130 detects a gesture of the predetermined target, the motion control unit 140 outputs a sound corresponding to the detected gesture from the sound output unit 118, or displays a predetermined image on the display unit 117.

Thus, the motion control unit 140 causes the robot 100 to make any of various different motions as the first motion, depending on the action of the predetermined target detected by the action detection unit 130. This allows the predetermined target to enjoy communicating with the robot 100. Here, the motion control unit 140 determines the motion to be made by the robot 100, with reference to the first motion table T1 stored in the memory 111. The first motion table T1 is a table defining the correspondence between the action of the predetermined target and the first motion to be made by the robot 100 in the case where the action detection unit 130 detects the action.

The motion control unit 140 is realized by the CPU 110 cooperating with the driver 113, the movable unit 114, the display unit 117, or the sound output unit 118.

In the case where the action detection unit 130 does not detect any action of the predetermined target to the robot 100, on the other hand, the motion control unit 140 causes the robot 100 to make a second motion different from the first motion. The second motion is a motion made by the robot 100 on its own independently of the predetermined target, and is a spontaneous motion without interaction (communication) with an interaction target such as the predetermined target present outside the robot 100. The second motion is also referred to as a self motion (self action, self play).

In other words, the motion control unit 140 causes the robot 100 to make the interaction motion in the case where the robot 100 interacts with any target present in the surroundings, and causes the robot 100 to make the self motion in the case where the robot 100 does not interact with any target present in the surroundings. The robot 100 is thus caused to make a realistic motion mimicking a pet, with it being possible to enhance affection for the robot 100.

In detail, in the case where the action detection unit 130 does not detect any action of the predetermined target to the robot 100, the motion control unit 140 determines the motion to be made by the robot 100 with reference to the second motion table T2 stored in the memory 111. The second motion table T2 is a table defining the second motion to be made by the robot 100 for each condition in the case where the action detection unit 130 does not detect any action of the predetermined target to the robot 100.

FIGS. 6 and 7 illustrate the second motion (self motion) defined in the second motion table T2. FIG. 6 illustrates examples of self motions in the case where the predetermined target such as a person is present around the robot 100 but there is no interaction with the robot 100. In the case where a specified time has elapsed from the last time the action detection unit 130 detected an action of the predetermined target to the robot 100, the motion control unit 140 causes the robot 100 to make any of the self motions illustrated in FIG. 6.

In detail, when the action detection unit 130 detects an action of the predetermined target to the robot 100, the motion control unit 140 starts measuring time by a timer unit (not illustrated). In the case where, after detecting the action of the predetermined target, the action detection unit 130 does not detect the next action of the predetermined target within the specified time, the motion control unit 140 determines that the interaction with the predetermined target ends, and starts a self motion. The specified time is, for example, 30 seconds or 1 minute, and is preset and stored in the memory 111.

In more detail, in the case where the specified time has elapsed from the last time the action detection unit 130 detected an action of the predetermined target to the robot 100, the motion control unit 140 causes the robot 100 to make a self motion that differs depending on information indicating the emotion of the robot 100. The information indicating the emotion of the robot 100 is information for the robot 100 to express emotions such as delight, anger, sorrow, and pleasure, which is set to vary depending on situation so as to mimic an actual animal.

In detail, the information indicating the emotion of the robot 100 is represented by a first emotion value "calm" indicating the degree of calmness and a second emotion value "excite" indicating the degree of excitement, as illustrated in FIG. 6. The robot 100 shows four emotions "lonely", "motivated", "happy", and "composed", based on the first emotion value and the second emotion value. The motion control unit 140 changes the first emotion value and the second emotion value depending on the action of the predetermined target in the interaction with the predetermined target and other situation, to change the emotion of the robot 100.

For example, in the case where the first emotion value and the second emotion value are both less than a threshold (0 in the example of FIG. 6), the robot 100 shows the emotion "lonely". In this case, the motion control unit 140 causes the robot 100 to make any one self motion of "move to corner of room looking for something and stare", "patrol in room several times", and the like. In the case where the first emotion value is less than the threshold and the second emotion value is not less than the threshold, the robot 100 shows the emotion "motivated". In this case, the motion control unit 140 causes the robot 100 to make any one self motion of "move to edge of room and wander around, looking to want to go outside", "perform one-man play", and the like. In the case where the first emotion value and the second emotion value are both not less than the threshold, the robot 100 shows the emotion "happy". In this case, the motion control unit 140 causes the robot 100 to make any one self motion of "sing", "keep rhythm", and the like. In the case where the first emotion value is not less than the threshold and the second emotion value is less than the threshold, the robot 100 shows the emotion "composed". In this case, the motion control unit 140 causes the robot 100 to make any one self motion of "gaze outside window", "stretch", and the like. Which of the plurality of self motions available for each emotion is to be made is determined randomly.

FIG. 7 illustrates examples of self motions resulting from the surrounding environment of the robot 100 or the time. In the case where the action detection unit 130 does not detect any action of the predetermined target to the robot 100 and at least one of the surrounding environment of the robot 100 and the time satisfies a specific condition, the motion control unit 140 causes the robot 100 to make any of the self motions illustrated in FIG. 7.

The surrounding environment of the robot 100 is information of the outside other than the predetermined target that can interact with the robot 100, such as sound level, temperature, air pressure, brightness, or obstacles. Such an environment is detected by the microphone, the touch sensor, the distance sensor, the temperature sensor, the air pressure sensor, or the like in the sensor unit 115. The time is information of current time, date, season, and the like, and is measured by the timer unit. The specific condition is a condition relating to the environment or the time. Examples of the specific condition include environment-related conditions such as "hear music", "hear conversation of people", "stroked without recognizing person", "high temperature", and "low temperature" and time-related conditions such as "time to sleep" and "morning of new year, birthday, etc.", as illustrated in FIG. 7.

In more detail, in the case where the action detection unit 130 does not detect any action of the predetermined target to the robot 100 and at least one of the surrounding environment of the robot 100 and the time satisfies a specific condition, the motion control unit 140 causes the robot 100 to make a self motion that differs depending on the at least one of the environment and the time. For example, in the case where the condition "hear music" is satisfied, the motion control unit 140 causes the robot 100 to make the self motion "change look and wander around". In the case where the condition "stroked without recognizing person" is satisfied, the motion control unit 140 causes the robot 100 to make the self motion "look around in surprise". In the case where the condition "morning of new year, birthday, etc." is satisfied, the motion control unit 140 causes the robot 100 to make the self motion "make related remark".

Thus, the motion control unit 140 operates at least one of the movable unit 114, the display unit 117, and the sound output unit 118 in the motion unit 190 in response to external stimulation, namely, the environment or the time, to cause the robot 100 to make a self motion corresponding to the stimulation.

The description returns to the functional structure of the failure diagnosis system 1 illustrated in FIG. 5. The failure diagnosis unit 150 diagnoses the failure of the robot 100, based on at least a part of the second motion (self motion) made by the motion control unit 140. The failure of the robot 100 means a state where the robot 100 does not function normally due to abnormality in any site of the robot 100.

The field "diagnosis site" in FIGS. 6 and 7 indicates one or more sites diagnosable with each self motion. The second motion table defines, for each self motion, one or more diagnosable sites from among (1) the display unit 117, (2) the movable unit 114, (3) the outer package of the robot 100, (4) the sound output unit 118, (5) the wireless communication unit 116, and (6) the sensor unit 115. While the robot 100 is making a self motion, the failure diagnosis unit 150 diagnoses a failure of at least one site diagnosable with the self motion, with reference to the second motion table.

For example, during the self motion "move to corner of room looking for something and stare" in FIG. 6, the failure diagnosis unit 150 diagnoses a failure of the movable unit 114 based on the moving time or moving quantity of the robot 100. During the self motion "sing" in FIG. 6, the failure diagnosis unit 150 diagnoses a failure of the sound output unit 118 based on the sound output from the sound output unit 118. During the self motion "change look and wander around" in FIG. 7, the failure diagnosis unit 150 diagnoses the failure of the movable unit 114 based on the moving time or moving quantity of the robot 100, and also diagnoses a failure of the display unit 117 based on a change in expression displayed on the display unit 117.

Other than the self motions illustrated in FIGS. 6 and 7, the robot 100 can also make self motions with which a failure of the outer package of the robot 100, wireless communication unit 116, or sensor unit 115 is diagnosable. Such a self motion with which a failure of any site of the robot 100 is diagnosable is referred to as a self motion for failure diagnosis. Self motions include self motions for failure diagnosis and other self motions different from the self motions for failure diagnosis. The other self motions are each a self motion with which the failure of any site of the robot 100 is not diagnosable. For example, the other self motions include self motions for which the diagnosis site field in FIGS. 6 and 7 is "none". The failure diagnosis unit 150 functions as a specifying unit that specifies a self motion for failure diagnosis from predetermined self motions including a self motion for failure diagnosis and an other self motion. The failure diagnosis unit 150 then diagnoses the failure of the robot 100, based only on the specified self motion for failure diagnosis from among the self motions. The following describes the failure diagnosis of each site in detail.

(1) Diagnosis of Display Unit 117

The failure diagnosis unit 150 diagnoses the failure of the display unit 117, by capturing an image displayed on the display unit 117 by the camera in the sensor unit 115. In detail, the failure diagnosis unit 150 analyzes the image on the display unit 117 obtained by the image capture, and diagnoses that the display unit 117 has a failure in the case where the display pattern of the display unit 117 such as luminance, color, or coloring timing is not within a tolerable range.

It is, however, difficult to capture the entire display unit 117 with only the camera equipped in the robot 100, and an external camera is preferably used to capture the display unit 117. Hence, the failure diagnosis of the display unit 117 of the robot 100 is mainly performed by the charging station 200. The failure diagnosis unit 150 transmits a diagnosis request to the charging station 200 via the wireless communication unit 116. A second failure diagnosis unit 220 in the charging station 200 captures the image displayed on the display unit 117 of the robot 100 by the camera in the sensor unit 215, and diagnoses the failure of the display unit 117 depending on whether or not the display pattern such as luminance, color, or coloring timing is within the tolerable range.

(2) Diagnosis of Movable Unit 114

The failure diagnosis unit 150 diagnoses the failure of the movable unit 114 based on the movement of the movable unit 114. The failure of the movable unit 114 means abnormality in movement of the head part 101, ear part 103, arm part 107, leg part 108, tail part 109, etc. The failure diagnosis unit 150 acquires movable sound of the motor, actuator, etc. in a case of moving any site of the movable unit 114, by the microphone in the sensor unit 115. In the case where sound level, sound range, or sound output time of the acquired movable sound is not within a tolerable range, the failure diagnosis unit 150 diagnoses that the site has the failure. Alternatively, the failure diagnosis unit 150 acquires position, moving time, or moving quantity of any site of the movable unit 114 in the case of moving the any site of the movable unit 114, by the camera or the like. In the case where the acquired position, moving time, or moving quantity is not within the tolerable range, the failure diagnosis unit 150 diagnoses that the site has the failure.

(3) Diagnosis of Outer Package of Robot 100

The failure diagnosis unit 150 diagnoses the failure of the outer package (appearance) of the robot 100, by capturing an image of the outer package by the camera in the sensor unit 115. The failure of the outer package means abnormality in appearance of the robot 100 due to damage, deformation, or the like of the outer package of the robot 100. The failure diagnosis unit 150 compares the captured image of the appearance of the robot 100 with an image in normal time, to diagnose whether or not the outer package of the robot 100 has abnormality.

It is, however, difficult to capture the entire outer package of the robot 100 with only the camera equipped in the robot 100, and an external camera is preferably used to capture the robot 100. Hence, the failure diagnosis of the outer package of the robot 100 is mainly performed by the charging station 200. The failure diagnosis unit 150 transmits a diagnosis request to the charging station 200 via the wireless communication unit 116. The second failure diagnosis unit 220 in the charging station 200 captures the robot 100 by the camera in the sensor unit 215, and diagnoses the failure of the outer package of the robot 100 by comparing the captured image with the image in normal time.

(4) Diagnosis of Sound Output Unit 118

The failure diagnosis unit 150 diagnoses the failure of the sound output unit 118, by acquiring a sound output from the sound output unit 118 by the microphone. In detail, the failure diagnosis unit 150 acquires the sound output from the sound output unit 118, by the microphone. In the case where sound level, sound range, sound output timing, or the like of the acquired sound is not within a tolerable range, the failure diagnosis unit 150 diagnoses that the sound output unit 118 has the failure.

(5) Diagnosis of Wireless Communication Unit 116

The failure diagnosis unit 150 diagnoses a failure of the wireless communication unit 116, by performing signal transmission and reception with the charging station 200. In detail, the failure diagnosis unit 150 transmits a specified test signal to the charging station 200. In the case where a specified response signal in response to the transmitted test signal cannot be received from the charging station 200, the failure diagnosis unit 150 diagnoses that the wireless communication unit 116 has the failure.

(6) Diagnosis of Sensor Unit 115

The failure diagnosis unit 150 diagnoses a failure of the sensor unit 115, by comparing a theoretical value and an actual measurement value obtained by the sensor unit 115 in the case of moving the movable unit 114. In detail, the failure diagnosis unit 150 compares the theoretical value of each of acceleration, rotation speed, position, and direction to be obtained in the case of moving the movable unit 114, with the actual measurement value obtained by the sensor unit 115 (acceleration sensor, gyrosensor, geomagnetic sensor, distance sensor, touch sensor, etc.). In the case where the difference between the theoretical value and the actual measurement value is not within a tolerable range, the failure diagnosis unit 150 diagnoses that the sensor unit 115 has the failure.

Thus, through the use of a self motion of the robot 100 made in the case of not interacting with the predetermined target, the failure diagnosis unit 150 diagnoses whether or not the site operated in association with the self motion has the failure. This enables the diagnosis of the failure of the robot 100 based on a spontaneous self motion of the robot 100. The failure diagnosis unit 150 is realized by the CPU 110 cooperating with the camera, the microphone, the acceleration sensor, or the like in the sensor unit 115.

The determination unit 160 determines whether or not a plurality of sites of the robot 100 to be failure-diagnosed by the failure diagnosis unit 150 include at least one site not failure-diagnosed from the aforementioned second motion (self motion). The plurality of sites of the robot 100 to be failure-diagnosed by the failure diagnosis unit 150 are the six sites described above, namely, (1) the display unit 117, (2) the movable unit 114, (3) the outer package of the robot 100, (4) the sound output unit 118, (5) the wireless communication unit 116, and (6) the sensor unit 115.

When the failure diagnosis unit 150 diagnoses a failure of any of the six sites during a self motion while the presence detection unit 120 detects the presence of the predetermined target, the failure diagnosis unit 150 sets a flag of the failure-diagnosed site to ON, and records it in the memory 111. When the presence detection unit 120 no longer detects the presence of the predetermined target, the determination unit 160 references to the flag of each site recorded in the memory 111, and determines any site whose flag is not ON as a site not failure-diagnosed. Thus, the determination unit 160 distinguishes a site failure-diagnosed with a self motion while the presence detection unit 120 detects the presence of the predetermined target, from a site not failure-diagnosed with a self motion while the presence detection unit 120 detects the presence of the predetermined target. The determination unit 160 is realized by the CPU 110 cooperating with the memory 111.

The motion control unit 140, in the case where the determination unit 160 determines that there is at least one site not failure-diagnosed, causes the robot 100 to make a third motion for diagnosing a failure of the at least one site. The third motion is a motion for complementing the failure diagnosis of the robot 100, and is a motion for diagnosing at least one site that cannot be diagnosed with the second motion.

For example, in the case where the failure of the movable unit 114 is diagnosed with the second motion "move to corner of room looking for something and stare", the five sites of the display unit 117, the outer package, the sound output unit 118, the wireless communication unit 116, and the sensor unit 115 are the sites not failure-diagnosed. The motion control unit 140 accordingly causes the motion unit 190 to make the third motion, to diagnose a failure of these five sites. In the case where the failure of each of the movable unit 114 and the display unit 117 is diagnosed with the second motion "change look and wander around" and the failure of the sound output unit 118 is diagnosed with the second motion "sing", the three sites of the outer package, the wireless communication unit 116, and the sensor unit 115 are the sites not failure-diagnosed. The motion control unit 140 accordingly causes the motion unit 190 to make the third motion, to diagnose a failure of these three sites.

The third motion may be any self motion illustrated in FIGS. 6 and 7, or another motion. The motion control unit 140 may cause the robot 100 to return to the charging station 200, to communicate with the charging station 200, or to make a special motion for failure diagnosis, according to need.

The motion control unit 140 causes the robot 100 to make the third motion, in the case where the presence detection unit 120 does not detect the presence of the predetermined target. In other words, in the case where the determination unit 160 determines that there is at least one site not failure-diagnosed, the motion control unit 140 causes the robot 100 to make the first motion (interaction motion) or the second motion (self motion) when the presence detection unit 120 detects the presence of the predetermined target, and causes the robot 100 to make the third motion when the presence detection unit 120 does not detect the presence of the predetermined target.

The case where the presence detection unit 120 does not detect the presence of the predetermined target is, for example, the case where the predetermined target is not present around the robot 100 such as when the user is out, or the case where the surroundings of the robot 100 are dark and the predetermined target cannot be detected such as when the user is sleeping. In these cases, the robot 100 is unlikely to be recognized (seen) by the predetermined target. While the robot 100 is not recognized by the predetermined target as in these cases, the motion control unit 140 causes the robot 100 to make the third motion.

This is because, since the third motion is mainly intended for failure diagnosis, the third motion may appear to be unusual to the predetermined target unlike the first motion which is a motion of interaction with the predetermined target or the second motion which is not a motion of interaction with the predetermined target but is a self motion supposed to be recognized by the predetermined target. By making the third motion in the case where the presence detection unit 120 does not detect the predetermined target, the robot 100 can be prevented from making an unusual motion while the presence detection unit 120 detects the predetermined target.

When the motion control unit 140 causes the robot 100 to make the third motion, the failure diagnosis unit 150 diagnoses a failure of at least one site not failure-diagnosed, based on at least a part of the third motion. The failure diagnosis based on the third motion by the failure diagnosis unit 150 is the same as the failure diagnosis of each of (1) the display unit 117, (2) the movable unit 114, (3) the outer package of the robot 100, (4) the sound output unit 118, (5) the wireless communication unit 116, and (6) the sensor unit 115 described with regard to the second motion. While the robot 100 is making the third motion, the failure diagnosis unit 150 diagnoses a failure of at least one site diagnosable with the third motion.

The transmission unit 170 transmits the result of diagnosis by the failure diagnosis unit 150, to the charging station 200. In detail, the transmission unit 170 transmits failure information indicating whether or not the robot 100 has the failure, which is obtained by the failure diagnosis unit 150 from the second motion or the third motion, to the charging station 200 via the wireless communication unit 116. The transmission unit 170 is thus realized by the CPU 110 cooperating with the wireless communication unit 116.

The following describes the functional structure of the charging station 200 in FIG. 5. The charging station 200 functionally includes the second failure diagnosis unit 220, a reception unit 230, and a notification unit 240. The CPU 210 reads the program stored in the ROM into the RAM and executes the program to perform control, thus functioning as each of these units.

The second failure diagnosis unit 220 executes a diagnosis support process for supporting the failure diagnosis of the robot 100, in response to a diagnosis request received from the robot 100. In detail, upon receiving a diagnosis request for the display unit 117 of the robot 100 via the communication unit 216, the second failure diagnosis unit 220 captures an image displayed on the display unit 117 of the robot 100 by the camera in the sensor unit 215, to diagnose the failure of the display unit 117. Upon receiving a diagnosis request for the outer package of the robot 100 via the communication unit 216, the second failure diagnosis unit 220 captures the robot 100 by the camera in the sensor unit 215, to diagnose the failure of the outer package of the robot 100. The second failure diagnosis unit 220 is thus realized by the CPU 210 cooperating with the camera in the sensor unit 215 or the communication unit 216.

The reception unit 230 receives the failure diagnosis result from the robot 100. In detail, when the transmission unit 170 in the robot 100 transmits failure information indicating whether or not the robot 100 has the failure, the reception unit 230 receives the failure information via the communication unit 216. The reception unit 230 is thus realized by the CPU 210 cooperating with the communication unit 216.

The notification unit 240 notifies the failure diagnosis result received by the reception unit 230. In detail, in the case where any site of the robot 100 has the failure according to the failure diagnosis result received by the reception unit 230, the notification unit 240 transmits the received diagnosis result to the terminal TM and the server SRV via the communication unit 216 and the network NW. By transmitting the diagnosis result to the terminal TM, the notification unit 240 notifies the user that the robot 100 has the failure. By transmitting the diagnosis result to the server SRV, the notification unit 240 notifies the management company that the robot 100 has the failure. The diagnosis result transmitted to the server SRV is stored in the database DB. In this way, the history of the failure diagnosis of the robot 100 is accumulated in the database DB. The notification unit 240 is thus realized by the CPU 210 cooperating with the communication unit 216.

Processes executed in the aforementioned failure diagnosis system 1 are described below, with reference to flowcharts in FIGS. 8 to 10.

Figure 8:
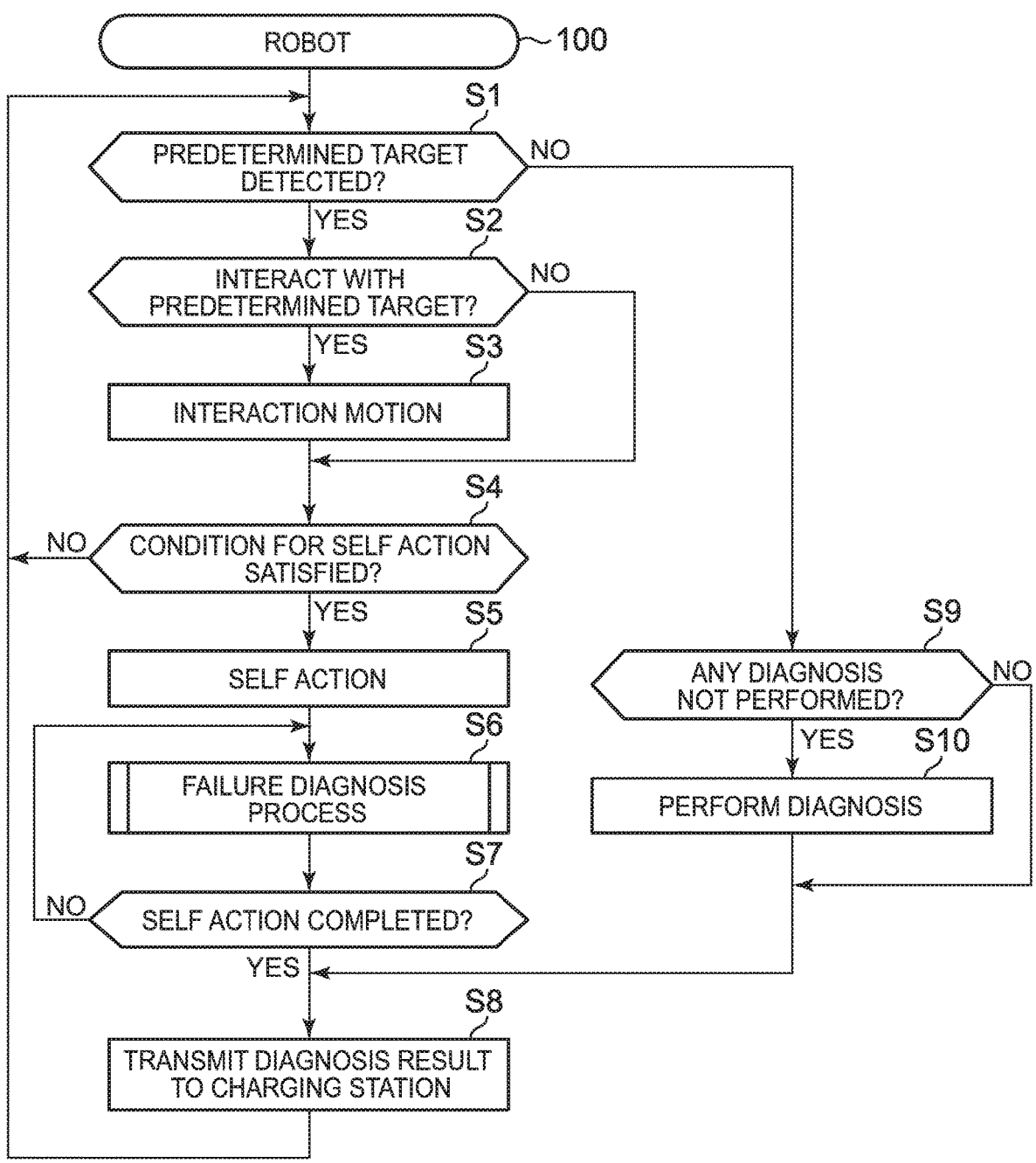
FIG. 8 is a flowchart illustrating a robot control process executed by the robot.

A robot control process executed by the robot 100 is described first, with reference to FIG. 8. The robot control process illustrated in FIG. 8 starts when the robot 100 is powered on and the battery 112 is charged so that the robot 100 is capable of normal operation.

When the robot control process starts, the CPU 110 in the robot 100 determines whether or not the predetermined target is detected (step S1). In detail, the CPU 110 captures an image of the surroundings of the robot 100 by the camera. The CPU 110 analyzes the captured image, and determines whether or not there is any target that can be an interaction (communication) partner for the robot 100, such as a person or an animal around the robot 100. In step S1, the CPU 110 functions as the presence detection unit 120.

In the case of detecting the predetermined target as an interaction partner as a result of the determination (step S1: YES), the CPU 110 determines whether or not to interact with the predetermined target (step S2). In detail, the CPU 110 determines whether or not an action from the predetermined target to the robot 100, such as a call, a touch, or a gesture, is detected via the microphone, the touch sensor, the camera, or the like in the sensor unit 115. In the case of detecting an action of the predetermined target to the robot 100, the CPU 110 determines to interact with the predetermined target. In step S2, the CPU 110 functions as the action detection unit 130.

In the case of interacting with the predetermined target (step S2: YES), the CPU 110 causes the robot 100 to make an interaction motion (step S3). The interaction motion is a motion for interacting with the predetermined target, and is the first motion for responding to the action of the predetermined target detected in step S2. In detail, the CPU 110 controls the movable unit 114, the display unit 117, or the sound output unit 118 in the motion unit 190, to cause the motion unit 190 to make a motion corresponding to the detected action. The robot 100 thus interacts (communicates) with the predetermined target. In step S3, the CPU 110 functions as the motion control unit 140.

In the case of not interacting with the predetermined target (step S2: NO), the CPU 110 skips step S3.

After interacting with the predetermined target or skipping step S3, the CPU 110 determines whether or not a condition for a self motion is satisfied (step S4). The condition for a self motion is a condition for the robot 100 to make the second motion without interaction with the predetermined target. For example, the condition for a self motion corresponds to the case where a specified time has elapsed from the last time an action of the predetermined target to the robot 100 was detected in step S2 or the case where at least one of the surrounding environment of the robot 100 and the time satisfies a specific condition illustrated in FIG. 7. The CPU 110 determines whether or not the condition for a self motion is satisfied, through the detection of the surrounding environment by the sensor unit 115 or the measurement of the time by timer unit.

In the case where the condition for a self motion is not satisfied (step S4: NO), the CPU 110 returns to step S1, and determines again whether or not the predetermined target is detected. While the predetermined target is detected and the condition for interacting with the predetermined target is satisfied, the CPU 110 repeats steps S1 to S4, to continue the interaction with the predetermined target.

In the case where the condition for a self motion is satisfied (step S4: YES), the CPU 110 causes the robot 100 to make a self motion (step S5). In detail, the CPU 110 controls the movable unit 114, the display unit 117, or the sound output unit 118 in the motion unit 190, to cause the motion unit 190 to make a self motion corresponding to the satisfied condition.

For example, in the case where the specified time has elapsed from the last time an action of the predetermined target was detected, the CPU 110 causes the motion unit 190 to make any of the self motions illustrated in FIG. 6, according to current information indicating the emotion of the robot 100. In the case where at least one of the surrounding environment of the robot 100 and the time satisfies the specific condition, on the other hand, the CPU 110 causes the motion unit 190 to make any of the self motions illustrated in FIG. 7. In step S5, the CPU 110 functions as the motion control unit 140.

While causing the robot 100 to make the self motion, the CPU 110 executes a failure diagnosis process (step S6). In step S6, the CPU 110 functions as the failure diagnosis unit 150. The failure diagnosis process in step S6 is described in detail below, with reference to a flowchart in FIG. 9.

Figure 9:
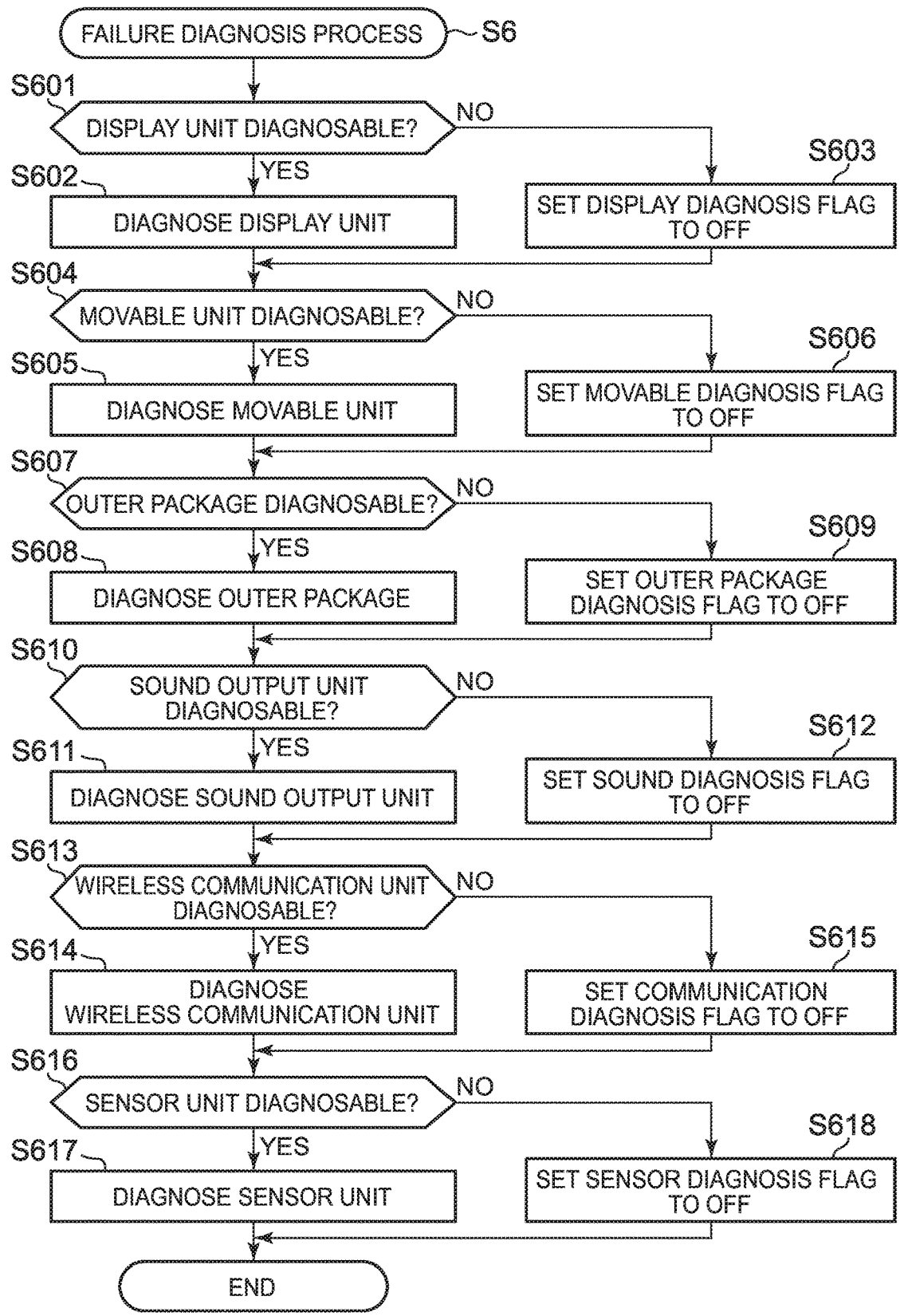
FIG. 9 is a flowchart illustrating a failure diagnosis process executed by the robot.
Figure 10:
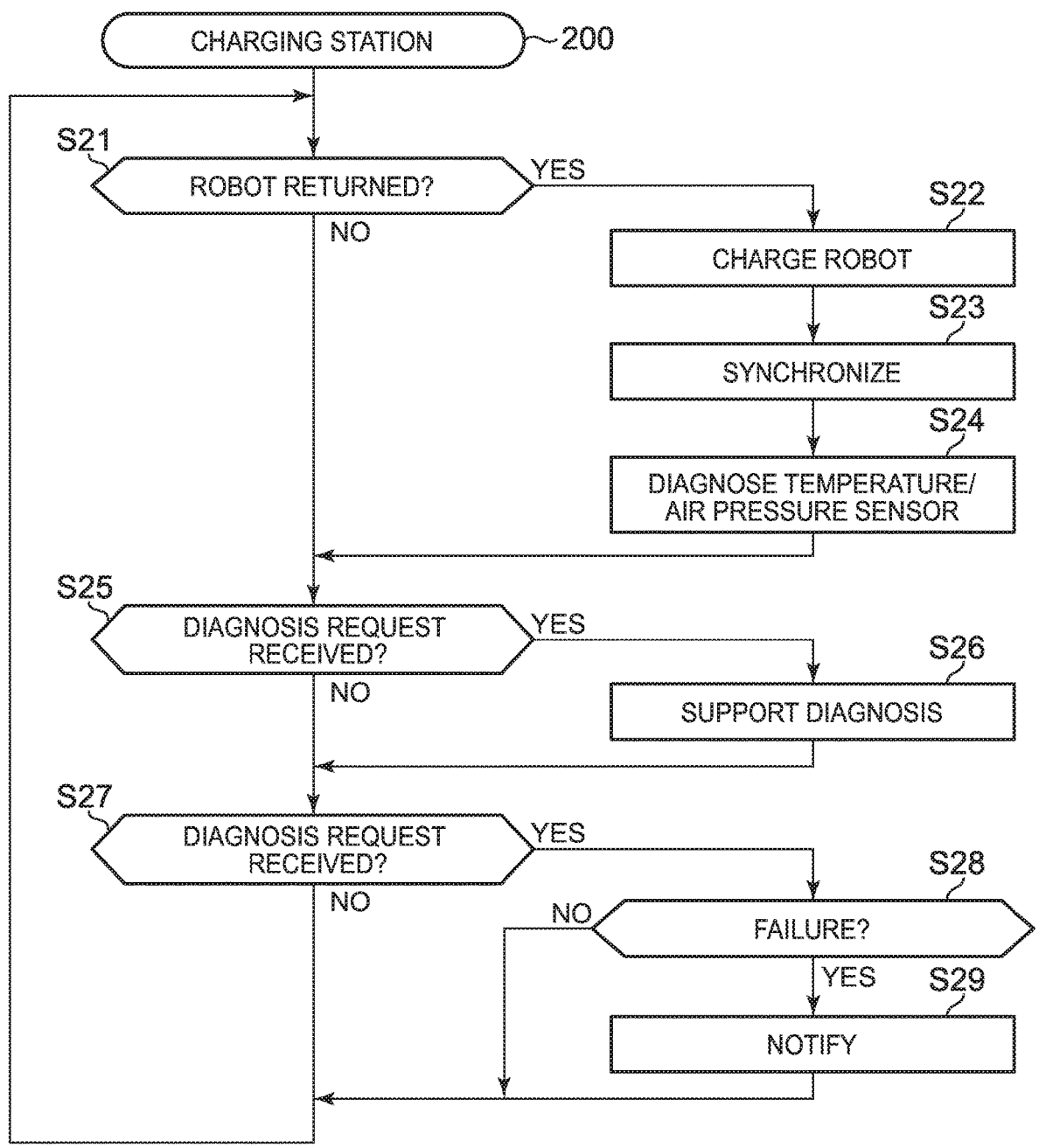
FIG. 10 is a flowchart illustrating a robot support process executed by the charging station.

When the failure diagnosis process illustrated in FIG. 9 starts, firstly the CPU 110 determines whether or not the display unit 117 is diagnosable with the self motion being made (step S601). In detail, the CPU 110 determines whether or not the site(s) diagnosable with the self motion includes the display unit 117, with reference to the second motion table illustrated in FIGS. 6 and 7.

In the case where the display unit 117 is diagnosable with the self motion (step S601: YES), the CPU 110 transmits a diagnosis request to the charging station 200. The charging station 200 captures the display unit 117 of the robot 100 by the camera, to diagnose the display unit 117 (step S602). The CPU 110 then sets a display diagnosis flag indicating whether or not the display unit 117 is diagnosed, to ON. In the case where the display unit 117 is not diagnosable with the self motion (step S601: NO), the CPU 110 sets the display diagnosis flag to OFF (step S603).

Secondly, the CPU 110 determines whether or not the movable unit 114 is diagnosable with the self motion being made (step S604). In detail, the CPU 110 determines whether or not the site(s) diagnosable with the self motion includes the movable unit 114, with reference to the second motion table.

In the case where the movable unit 114 is diagnosable with the self motion (step S604: YES), the CPU 110 diagnoses the movable unit 114 based on movable sound of the movable unit 114, position, moving time, or moving quantity of the movable unit 114, or the like (step S605). The CPU 110 then sets a movable diagnosis flag indicating whether or not the movable unit 114 is diagnosed, to ON. In the case where the movable unit 114 is not diagnosable with the self motion (step S604: NO), the CPU 110 sets the movable diagnosis flag to OFF (step S606).

Thirdly, the CPU 110 determines whether or not the outer package of the robot 100 is diagnosable with the self motion being made (step S607). In detail, the CPU 110 determines whether or not the site(s) diagnosable with the self motion includes the outer package, with reference to the second motion table.

In the case where the outer package of the robot 100 is diagnosable with the self motion (step S607: YES), the CPU 110 transmits a diagnosis request to the charging station 200. The charging station 200 captures the appearance of the robot 100 by the camera, to diagnose the outer package of the robot 100 (step S608). The CPU 110 then sets an outer package diagnosis flag indicating whether or not the outer package is diagnosed, to ON. In the case where the outer package of the robot 100 is not diagnosable with the self motion (step S607: NO), the CPU 110 sets the outer package diagnosis flag to OFF (step S609).

Fourthly, the CPU 110 determines whether or not the sound output unit 118 is diagnosable with the self motion being made (step S610). In detail, the CPU 110 determines whether or not the site(s) diagnosable with the self motion includes the sound output unit 118, with reference to the second motion table.

In the case where the sound output unit 118 is diagnosable with the self motion (step S610: YES), the CPU 110 acquires a sound output from the sound output unit 118 by the microphone, to diagnose the sound output unit 118 (step S611). The CPU 110 then sets a sound diagnosis flag indicating whether or not the sound output unit 118 is diagnosed, to ON. In the case where the sound output unit 118 is not diagnosable with the self motion (step S610: NO), the CPU 110 sets the sound diagnosis flag to OFF (step S612).

Fifthly, the CPU 110 determines whether or not the wireless communication unit 116 is diagnosable with the self motion being made (step S613). In detail, the CPU 110 determines whether or not the site(s) diagnosable with the self motion includes the wireless communication unit 116, with reference to the second motion table.

In the case where the wireless communication unit 116 is diagnosable with the self motion (step S613: YES), the CPU 110 performs signal transmission and reception with the charging station 200, to diagnose the wireless communication unit 116 (step S614). The CPU 110 then sets a communication diagnosis flag indicating whether or not the wireless communication unit 116 is diagnosed, to ON. In the case where the wireless communication unit 116 is not diagnosable with the self motion (step S613: NO), the CPU 110 sets the communication diagnosis flag to OFF (step S615).

Sixthly, the CPU 110 determines whether or not the sensor unit 115 is diagnosable with the self motion being made (step S616). In detail, the CPU 110 determines whether or not the site(s) diagnosable with the self motion includes the sensor unit 115, with reference to the second motion table.

In the case where the sensor unit 115 is diagnosable with the self motion (step S616: YES), the CPU 110 compares a theoretical value and an actual measurement value obtained by the sensor unit 115 in the case of moving the movable unit 114, to diagnose the sensor unit 115 (step S617). The CPU 110 then sets a sensor diagnosis flag indicating whether or not the sensor unit 115 is diagnosed, to ON. In the case where the sensor unit 115 is not diagnosable with the self motion (step S616: NO), the CPU 110 sets the sensor diagnosis flag to OFF (step S618). This completes the failure diagnosis process illustrated in FIG. 9.

Returning to FIG. 8, the CPU 110 determines whether or not the self motion started in step S5 is completed (step S7). In the case where the self motion is not completed (step S7: NO), the CPU 110 returns to step S6, and executes the failure diagnosis process illustrated in FIG. 9 again. Thus, during the self motion, the CPU 110 repeats the failure diagnosis that can be performed using the self motion.

Once the self motion has been completed (step S7: YES), the CPU 110 transmits the diagnosis result to the charging station 200 (step S8). In detail, the CPU 110 transmits the failure diagnosis result obtained during the self motion in step S6, to the charging station 200 via the wireless communication unit 116.

Having transmitted the diagnosis result to the charging station 200, the CPU 110 returns to step S1, and determines again whether or not the predetermined target is detected. In the case where the predetermined target is detected as a result of the determination, the CPU 110 performs step S2 onward. Thus, while the predetermined target is detected, the CPU 110 repeatedly performs the process of making a motion of interaction with the predetermined target or a self motion and diagnosing the failure of the robot 100 using at least a part of the self motion.

In the case where the predetermined target is not detected in step S1 (step S1: NO), the CPU 110 determines whether or not there is any diagnosis not performed yet (step S9). In detail, the CPU 110 determines whether or not any of the display diagnosis flag, the movable diagnosis flag, the outer package diagnosis flag, the sound diagnosis flag, the communication diagnosis flag, and the sensor diagnosis flag is set to OFF. In the case where there is at least one flag set to OFF, the CPU 110 determines that there is diagnosis not performed yet. In step S9, the CPU 110 functions as the determination unit 160.

In the case where there is diagnosis not performed yet (step S9: YES), the CPU 110 performs the diagnosis (step S10). In detail, the CPU 110 causes the robot 100 to make the third motion for diagnosing the failure of at least one site not failure-diagnosed in step S6. The failure diagnosis unit 150 diagnoses the failure of the at least one site not failure-diagnosed, based on the third motion. In step S10, the CPU 110 functions as the motion control unit 140 and the failure diagnosis unit 150.

In the case where there is no diagnosis not performed yet (step S9: NO), the CPU 110 skips step S10.

Having performed the process in the case of not detecting the predetermined target in this way, the CPU 110 proceeds to step S8, and transmits the diagnosis result to the charging station 200. In detail, the CPU 110 transmits the failure diagnosis result obtained in step S10, to the charging station 200 via the wireless communication unit 116. In step S8, the CPU 110 functions as the transmission unit 170.

Having transmitted the diagnosis result to the charging station 200, the CPU 110 returns to step S1, and determines again whether or not the predetermined target is detected. In the case where the predetermined target is detected as a result of the determination, the CPU 110 performs steps S2 to S8. In the case where the predetermined target is not detected, the CPU 110 performs steps S9 to S10. Thus, while the predetermined target is detected, the robot 100 repeatedly performs the process of making the first motion (interaction motion) with the predetermined target or the second motion (self motion) and diagnosing the failure of the robot 100 using at least a part of the self motion. When the predetermined target is no longer detected, the robot 100 diagnoses the failure of any site that cannot be diagnosed while the predetermined target is detected.

A robot support process executed by the charging station 200 is described next, with reference to FIG. 10. The robot support process illustrated in FIG. 10 is executed any time in a state where the charging station 200 is powered on and is capable of normal operation.

When the robot support process starts, the CPU 210 in the charging station 200 determines whether or not the robot 100 has returned (step S21). The robot 100 periodically returns to the charging station 200, to charge the battery 112 and to undergo specific failure diagnosis by the charging station 200. The CPU 210 determines whether or not the robot 100 has returned, depending on whether or not the robot 100 is connected to the charge circuit 212.

In the case where the robot 100 has returned (step S21: YES), the CPU 210 charges the robot 100 (step S22). In detail, the CPU 210 charges the battery 112 of the robot 100 via the charge circuit 212.

While charging the robot 100, the CPU 210 synchronizes the robot 100 and the charging station 200 so as to enable cooperation with the robot 100 (step S23). The CPU 210 also diagnoses the temperature sensor and the air pressure sensor in the robot 100 (step S24). In detail, in the case where the difference between the measurement value of the temperature sensor in the robot 100 and the measurement value of the temperature sensor in the charging station 200 is within a predetermined tolerable range, the CPU 210 determines that the temperature sensor in the robot 100 is normal. In the case where the difference is not within the tolerable range, the CPU 210 determines that the temperature sensor in the robot 100 has the failure. The same applies to the air pressure sensor.

In the case where the robot 100 has not returned in step S21 (step S21: NO), the CPU 210 skips step S22.

Next, the CPU 210 determines whether or not a diagnosis request is received from the robot 100 (step S25). The diagnosis request is transmitted from the robot 100 to the charging station 200 in the case of diagnosing, in step S6 in FIG. 8, a site that is difficult to be diagnosed by the robot 100 alone, namely, the display unit 117 or the outer package.

In the case of receiving the diagnosis request from the robot 100 (step S25: YES), the CPU 210 supports the diagnosis of the robot 100 (step S26). In detail, the CPU 210 captures the display unit 117 or outer package of the robot 100 by the camera in the sensor unit 215, to diagnose the failure of the display unit 117 or the outer package. In step S26, the CPU 210 functions as the second failure diagnosis unit 220.

In the case of not receiving the diagnosis request from the robot 100 in step S25 (step S25: NO), the CPU 210 skips step S26.

The CPU 210 further determines whether or not a diagnosis result is received from the robot 100 (step S27). The diagnosis result is the result of failure diagnosis performed by the robot 100, and is transmitted from the robot 100 to the charging station 200 in step S8 in FIG. 8. In step S27, the CPU 210 functions as the reception unit 230.

In the case of receiving the diagnosis result from the robot 100 (step S27: YES), the CPU 210 determines whether or not the robot 100 has the failure, based on the diagnosis result (step S28). In detail, having received the diagnosis result from the robot 100, the CPU 210 determines whether or not the received diagnosis result indicates that any site of the robot 100 has the failure.

In the case where the robot 100 has the failure (step S28: YES), the CPU 210 notifies the received diagnosis result (step S29). In detail, the CPU 210 transmits the received diagnosis result to the terminal TM and the server SRV via the network NW. In this way, the CPU 210 notifies the user and the management company that the robot 100 has the failure. In step S29, the CPU 210 functions as the notification unit 240.

In the case where the robot 100 does not have the failure in step S28 (step S28: NO), the CPU 210 skips step S29. In the case of not receiving the diagnosis result from the robot 100 in step S27 (step S27: NO), the CPU 210 skips steps S28 and S29.

The CPU 210 then returns to step S21, and repeats steps S21 to S29. Thus, the charging station 200 executes the process of supporting the robot 100, depending on whether or not the robot 100 has returned, whether or not the diagnosis request is received from the robot 100, and whether or not the diagnosis result is received from the robot 100.

As described above, in the failure diagnosis system 1 according to this embodiment, the robot 100 diagnoses the failure of the robot 100 based on at least a part of a self motion made in the case of not detecting an action of the predetermined target to the robot 100. Since failure diagnosis is performed using the self motion while the robot 100 is making the self motion, there is no need to force the robot 100 to make an unusual motion for failure diagnosis. Hence, the failure of the robot 100 can be diagnosed based on a spontaneous self motion of the robot 100. Moreover, since the robot 100 does not need to return to the charging station 200, the failure of the robot 100 can be diagnosed easily and conveniently.

Furthermore, in the case where the plurality of sites to be failure-diagnosed include at least one site not failure-diagnosed from the self motion, the robot 100 according to this embodiment makes the third motion for diagnosing the failure of the at least one site if the presence of the predetermined target is not detected. In other words, in the case where the presence of the predetermined target is detected, the robot 100 performs failure diagnosis on a site diagnosable by a self motion. Meanwhile, the robot 100 performs failure diagnosis on a site that cannot be diagnosed with the self motion, in the case where the presence of the predetermined target is not detected. This enables the robot 100 to reliably perform failure diagnosis for all of the plurality of sites to be failure-diagnosed, while not making any unusual motion when the presence of the predetermined target is detected.

(Modifications)

Although the embodiment of the present invention has been described above, the foregoing embodiment is an example, and should not limit the scope of the present invention. Various modifications may be made to the embodiment of the present invention, and all such embodiments are included in the scope of the present invention.

For example, in the foregoing embodiment, the robot 100 is a robotic pet made in the image of a small dog. However, the robot 100 according to the present invention is not limited to the shape mimicking a small dog, and may have any shape. For example, the robot 100 according to the present invention may be a robot mimicking a large dog, a robot mimicking any other type of animal such as a cat, a mouse, or a rabbit, or a robot mimicking a human.

In the foregoing embodiment, in the case where the determination unit 160 determines that there is at least one site not failure-diagnosed, the motion control unit 140 causes the robot 100 to make the third motion for diagnosing the failure of the at least one site when the presence detection unit 120 does not detect the presence of the predetermined target. However, in the present invention, in the case where the determination unit 160 determines that there is at least one site not failure-diagnosed, the motion control unit 140 may cause the robot 100 to make a motion for requesting the predetermined target to diagnose the failure of the at least one site, as the third motion. In detail, in the case where the display unit 117 or the outer package has not been diagnosed in the second motion, the motion control unit 140 displays an image on the display unit 117 or output a sound from the sound output unit 118 so as to capture the display unit 117 or outer package of the robot 100 by the camera. In this way, failure diagnosis not performed yet can be carried out while interacting with the predetermined target.

In the foregoing embodiment, the CPU 110 in the robot 100 executes the program stored in the ROM to function as each of the presence detection unit, the action detection unit, the motion control unit, the failure diagnosis unit, the determination unit, and the transmission unit. However, in the present invention, the robot 100 may include dedicated hardware such as an application specific integrated circuit (ASIC), a field-programmable gate array (FPGA), or any type of control circuit instead of a CPU, where the dedicated hardware functions as each of the presence detection unit, the action detection unit, the motion control unit, the failure diagnosis unit, the determination unit, and the transmission unit. The functions of the respective units may be realized by separate hardware, or may be collectively realized by single hardware. Part of the functions of the units may be realized by dedicated hardware and the other part by software or firmware. The same applies to the charging station 200.

The present invention may be implemented not only as a robot and charging station having the structures for achieving the functions according to the present invention beforehand, but also by applying a program to cause an existing information processing device or the like to function as a robot and a charging station according to the present invention. In other words, by applying a program for achieving the functional structures of the robot 100 and charging station 200 described in the foregoing embodiment so as to be executable by a CPU or the like controlling an existing information processing device or the like, the existing information processing device or the like can function as a robot and a charging station according to the present invention.

Such a program may be applied in any way. For example, the program may be stored in a computer-readable storage medium such as a flexible disk, CD (Compact Disc)-ROM, DVD (Digital Versatile Disc)-ROM, or a memory card. The program may be superimposed on a carrier wave and provided via a communication medium such as the Internet. For example, the program may be presented on a bulletin board system (BBS) on a communication network and distributed. The processes described above may be enabled by starting the program and executing the program in the same way as other application programs under control of an operating system (OS).

Although a preferred embodiment of the present invention has been described above, the present invention is not limited to such a particular embodiment and includes the scope of the invention defined in the claims and its equivalent scope.

What is claimed is:

1. A robot comprising:
   a memory; and
   a processor which operates under control of a program stored in the memory, the processor being configured to:
   detect an action of a predetermined target to the robot, in cooperation with a sensor;
   cause the robot to make a first motion as an interaction motion for responding to the action in a case where the action is detected;
   cause the robot to make a second motion as a spontaneous self motion without interaction with the predetermined target in a case where the action is not detected, the second motion being different from the first motion; and
   diagnose a failure of the robot based only on a self motion for failure diagnosis included in the second motion.

2. The robot according to claim 1, wherein the second motion includes the self motion for failure diagnosis and another self motion different from the self motion for failure diagnosis, and
   wherein the processor is configured to specify the self motion for failure diagnosis included in the second motion.

3. The robot according to claim 1, wherein the processor is configured to cause the robot to make the second motion in a case where a specified time has elapsed from a last time that the action was detected.

4. The robot according to claim 3, wherein the second motion differs depending on information indicating an emotion of the robot.

5. The robot according to claim 1, wherein the processor is configured to cause the robot to make the second motion in a case where the action is not detected and at least one of a surrounding environment of the robot and a time satisfies a specific condition.

6. The robot according to claim 5, wherein the second motion differs depending on the at least one of the surrounding environment and the time.

7. The robot according to claim 1, further comprising at least one of:
   an actuator configured to drive a movable unit;
   a display configured to display an image; and
   a speaker configured to output a sound,
   wherein the processor is configured to cause the robot to make the first motion or the second motion, by operating the at least one of the actuator, the display, and the speaker.

8. The robot according to claim 1, further comprising an actuator configured to drive a movable unit,
   wherein the processor is configured to cause the robot to make the second motion by driving the movable unit in cooperation with the actuator, and to diagnose a failure of the movable unit based on movement of the movable unit.

9. The robot according to claim 1, further comprising a speaker configured to output a sound,
   wherein the processor is configured to cause the robot to make the second motion by causing the speaker to output the sound, and to diagnose a failure of the speaker by acquiring the sound output from the speaker by a microphone.

10. The robot according to claim 1, wherein the processor is configured to:
    determine whether or not at least one site not failure-diagnosed from the second motion is included in a plurality of sites of the robot to be failure-diagnosed;
    in a case where it is determined that the at least one site is included, cause the robot to make a third motion for diagnosing a failure of the at least one site; and
    diagnose the failure of the at least one site, based on at least a part of the third motion.

11. The robot according to claim 10, wherein the processor is configured to:
    detect presence of the predetermined target, in cooperation with a sensor;
    in the case where it is determined that the at least one site is included, cause the robot to make the first motion or the second motion in a case where the presence of the predetermined target is detected, and cause the robot to make the third motion in a case where the presence of the predetermined target is not detected.

12. The robot according to claim 10, wherein the processor is configured to, in the case where it is determined that the at least one site is included, cause the robot to make a motion of requesting the predetermined target to diagnose the failure of the at least one site, as the third motion.

13. The robot according to claim 1, wherein the predetermined target is a user who owns the robot, the user's family, the user's friend, or an animal kept by the user.

14. A failure diagnosis system comprising:
    the robot according to claim 1; and
    a charging station that charges the robot.

15. A failure diagnosis method executed by a robot for diagnosing a failure of the robot, the method comprising:
    detecting an action of a predetermined target to the robot, in cooperation with a sensor;
    causing the robot to make a first motion as an interaction motion for responding to the action in a case where the action is detected;
    causing the robot to make a second motion as a spontaneous self motion without interaction with the predetermined target in a case where the action is not detected, the second motion being different from the first motion; and
    diagnosing the failure of the robot based only on a self motion for failure diagnosis included in the second motion.

16. A non-transitory computer-readable storage medium having stored therein a program for causing a computer of a robot to:
    detect an action of a predetermined target to the robot, in cooperation with a sensor;
    cause the robot to make a first motion as an interaction motion for responding to the action in a case where the action is detected;

cause the robot to make a second motion as a spontaneous self motion without interaction with the predetermined target in a case where the action is not detected, the second motion being different from the first motion; and diagnose a failure of the robot based only on a self motion for failure diagnosis included in the second motion.

* * * * *